(12) United States Patent
Turcanu et al.

(10) Patent No.: US 12,199,823 B2
(45) Date of Patent: Jan. 14, 2025

(54) METHOD AND APPARATUS FOR PREDICTING AND ADAPTING TO MOBILE RADIO LINK CHARACTERISTICS IN A SECTOR

(71) Applicant: Telefonaktiebolaget LM Ericsson (publ), Stockholm (SE)

(72) Inventors: Adrian Turcanu, Ottawa (CA); Jagadish Ghimire, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/260,992

(22) PCT Filed: Jan. 19, 2021

(86) PCT No.: PCT/IB2021/050385
§ 371 (c)(1),
(2) Date: Jul. 11, 2023

(87) PCT Pub. No.: WO2022/157535
PCT Pub. Date: Jul. 28, 2022

(65) Prior Publication Data
US 2024/0064061 A1 Feb. 22, 2024

(51) Int. Cl.
*H04L 41/0816* (2022.01)
*G06N 20/00* (2019.01)
*H04L 41/147* (2022.01)

(52) U.S. Cl.
CPC ......... *H04L 41/0816* (2013.01); *G06N 20/00* (2019.01); *H04L 41/147* (2013.01)

(58) Field of Classification Search
CPC .................................................... G06N 20/00
See application file for complete search history.

(56) References Cited

U.S. PATENT DOCUMENTS 11,398,094 B1* 7/2022 Hallman ................. G06N 20/00
11,443,516 B1* 9/2022 Hallman ................. G06V 20/52
2020/0288296 A1 9/2020 Fiorese et al.

FOREIGN PATENT DOCUMENTS

WO 2019/158802 A1 8/2019
WO 2019/233589 A1 12/2019
WO 2020/178013 A1 9/2020

OTHER PUBLICATIONS

International Search Report and Written Opinion dated Sep. 23, 2021 issued in PCT Application No. PCT/IB2021/050385 filed Jan. 19, 2021, consisting of 14 pages.

* cited by examiner

*Primary Examiner* — Barbara B Anyan
(74) *Attorney, Agent, or Firm* — Weisberg I.P. Law, P.A.

(57) ABSTRACT

A method and network node for predicting and adapting to mobile radio link characteristics in a sector are disclosed. According to one aspect, a method includes learning a set of at least one trajectory based at least in part on a first set of observations received from at least one wireless device (WD), a trajectory including a subset of the first set of observations. The method also includes assigning a trajectory in the set of at least one trajectory to a first WD of the at least one WD based at least in part on a second set of observations received from the first WD subsequent to receipt of the first set of observations. The method further includes adjusting an update period for receiving future observations from the first WD based at least in part on the assigned trajectory.

16 Claims, 10 Drawing Sheets

METHOD AND APPARATUS FOR PREDICTING AND ADAPTING TO MOBILE RADIO LINK CHARACTERISTICS IN A SECTOR

CROSS-REFERENCE TO RELATED APPLICATIONS

This application is a Submission Under 35 U.S.C. § 371 for U.S. National Stage Patent Application of International Application Number: PCT/IB2021/050385, filed Jan. 19, 2021 entitled "METHOD AND APPARATUS FOR PREDICTING AND ADAPTING TO MOBILE RADIO LINK CHARACTERISTICS IN A SECTOR," the entirety of which is incorporated herein by reference.

TECHNICAL FIELD

This disclosure relates to wireless communication and in particular, to predicting and adapting to mobile radio link characteristics in a sector.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

The current link adaptation control loop technology, as supported by the 3GPP standard, relies on decisions made solely based on channel feedback reports (measurement reports and, if available, acknowledgement and non-acknowledgment responses from the WDs (ACK/NACK) for individual transmissions). In this disclosure, a wireless device includes mobile wireless devices and stationary wireless devices. The attempt at estimating the radio channel is limited to the very near future, defined by the interval between consecutive channel state information CSI measurements. The assumption is that the radio channel behaves randomly in the sense that the future state of a radio channel cannot be predicted accurately unless measured. Accuracy depends on a tradeoff between variables such as measurement rate on the one hand versus resource consumption plus minimal transmission for minimizing interference on the other hand.

Tight feedback loops to determine the current state of the radio link for wireless devices consume a lot of radio resources. This is especially so in narrow beam radio links with frequent polling of the radio link. The current state of the radio link may be indicated by the precoder matrix indicator (PMI), rank indicator (RI), channel quality index (CQI). Beam azimuth and beam width also may affect how tight the feedback loop should be.

SUMMARY

Some embodiments advantageously provide a method and system for predicting and adapting to mobile radio link characteristics in a sector.

The 3GPP standards assume that wireless devices follow a somewhat random path through a geography. However, in reality, wireless devices in a network follow people and people move with a purpose. Sometimes they move together and for at least a subset of the wireless devices in the network, one can imagine that geographical movement is naturally constrained and follows predetermined and predictable paths, as is the case for cars on a highway, people walking on sidewalk of a busy street, etc.).

Two or more wireless devices following an identical geographical trajectory would not necessarily exhibit identical radio link characteristics at every point on the trajectory. However, it is likely that the radio link characteristics will exhibit a level of correlation that depends on factors such as weather, speed of travel, other wireless devices in the network (which may cause interference), other moving objects in the neighborhood, etc.

However, assuming that the correlation in radio link characteristics for wireless devices following similar geographical trajectory is high enough to be detected, one can imagine that any new wireless device following the same trajectory can in theory be "detected" with an increasingly higher degree of probability and therefore future characteristics of that trajectory can be anticipated and applied, thus reducing the need for frequent polling of the radio link status, saving precious over-the-air resources and potentially increasing the capacity of the sector.

Some examples include:
Active, quasi-stationary wireless devices (e.g., video/audio streaming while stuck in traffic in rush hour)
Passengers traveling together in a bus between 2 stops From a base station perspective, a "trajectory" is defined as an array of radio link measurements, each measurement consisting of a collection of radio link attributes (e.g., PMI, RI, CQI, Beam Information, reference signal received power (RSRP) etc.), as well as the associated action such as the selection of transport format including modulation and coding scheme (MCS), also known as link adaptation.

A memory structure based on a reinforcement learning neural network may arguably be a best tool to "learn" trajectories of devices in the sector. The neural network takes as an input an array of recent radio link measurements for a given device and provides as output a limited set of possible trajectories with, for each trajectory, the probability that this is the trajectory that the wireless device is on).

Consider a wireless device that travels on a well-travelled geographical path. At first, the device may be in a "data collection" state where measurements are collected and regular link adaptation is performed.

Once enough data was collected, the device state transitions to an exploratory and learning state, where the network node servicing the device performs lookups for possible known trajectory matches. Measurements are collected regularly and normal link adaptation algorithms are run. The result of the link adaptation algorithm is compared with the known trajectories output from the neural network. If a match is found between the result of the link adaptation algorithm and the known trajectories output from the neural network, the known trajectory is "reinforced" in the network node. Otherwise, if a match is not found, the trajectory is "learned" by the NN as a new "known trajectory".

At some point in time, the NN lookup may provide a known trajectory that exceeds a certain threshold of certainty. The wireless device (WD) is transitioned to a known trajectory link adaptation state where link adaptation output parameters, such as MCS are at least in part read from a data structure associated with the known trajectory. Also, channel measurement frequency can be decreased to levels that are appropriate for the radio link speed of change associated with the known trajectory A WD's radio link on a known trajectory is continuously monitored through ACK/NACK as well as less frequent CSI measurements to ensure it is still on the known trajectory. In some embodiments, two devices traveling the same path at different speeds will be recognized as belonging to the same trajectory rather than two different trajectories.

Some advantages of some embodiments include possible reduction in frequency of CSI measurements for some WDs in a sector served by a network node. This can increase sector capacity because more over the air (OTA) control channel resources as well as shared channel resources are available for other wireless devices. Reducing the frequency of CSI measurements also decreases interference in the network by increasing periods of radio silence for some WDs. Further the reduction in CSI measurement frequency decreases the amount of computing in the network node. Further, the battery life of the WD is also conserved where fewer CSI reports are sent by the WD.

Thus, according to one aspect, a method in a network node configured to communicate with a wireless device (WD) is provided. The method includes learning a set of at least one trajectory based at least in part on a first set of observations received from at least one WD, a trajectory including a subset of the first set of observations. The method also includes assigning a trajectory in the set of at least one trajectory to a first WD of the at least one WD based at least in part on a second set of observations received from the first WD subsequent to receipt of the first set of observations. The method further includes adjusting an update period for receiving future observations from the first WD based at least in part on the assigned trajectory.

According to this aspect, in some embodiments, the method further includes periodically updating at least one trajectory of the set of at least one trajectory based on observations received from the at least one WD subsequent to receipt of the second set of observations. In some embodiments, assigning the trajectory to the first WD includes maximizing an accumulated reward over a period of time. In some embodiments, a reward to be accumulated in the accumulated reward is reinforcing if a spectral efficiency achieved by the update period deviates from a spectral efficiency achieved by a baseline update period by less than a threshold amount. In some embodiments, the accumulated reward is based at least in part on how long the first WD is considered to belong to an assigned trajectory. In some embodiments, learning the set of at least one trajectory includes updating a policy by which to pick a trajectory to assign to the first WD, the updating being based at least in part on observations of the first set of observations. In some embodiments, the updating begins with a random policy. In some embodiments, the method further includes selecting a policy by which to pick the trajectory to assign to the first WD, the selected policy having a highest expected return of a set of policies. In some embodiments, a policy having a highest expected return of a set of policies is determined based on a neural network applied to a set of observations of the second set of observations. In some embodiments, an observation of one of the first and second set of observations includes at least one of a channel quality indicator, a precoder matrix indicator and statistics on block errors.

According to another aspect, a network node is configured to communicate with a wireless device (WD). The network node includes processing circuitry configured to: learn a set of at least one trajectory based at least in part on a first set of observations received from at least one WD, a trajectory including a subset of the first set of observations; assign a trajectory in the set of at least one trajectory to a first WD of the at least one WD based at least in part on a second set of observations received from the first WD subsequent to receipt of the first set of observations; and adjust an update period for receiving future observations from the first WD based at least in part on the assigned trajectory. In some embodiments, the processing circuitry is further configured to periodically update at least one trajectory of the set of at least one trajectory based on observations received from the at least one WD subsequent to receipt of the second set of observations. In some embodiments, assigning the trajectory to the first WD includes maximizing an accumulated reward over a period of time. In some embodiments, a reward to be accumulated in the accumulated reward is reinforcing if a spectral efficiency achieved by the update period deviates from a spectral efficiency achieved by a baseline update period by less than a threshold amount. In some embodiments, the accumulated reward is based at least in part on how long the first WD is considered to belong to an assigned trajectory. In some embodiments, learning the set of at least one trajectory includes updating a policy by which to pick a trajectory to assign to the first WD, the updating being based at least in part on observations of the first set of observations. In some embodiments, the updating begins with a random policy. In some embodiments, the processing circuitry is further configured to select a policy by which to pick the trajectory to assign to the first WD, the selected policy having a highest expected return of a set of policies. In some embodiments, a policy having a highest expected return of a set of policies is determined based on a neural network applied to a set of observations of the second set of observations. In some embodiments, an observation of one of the first and second set of observations includes at least one of a channel quality indicator, a precoder matrix indicator and statistics on block errors.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
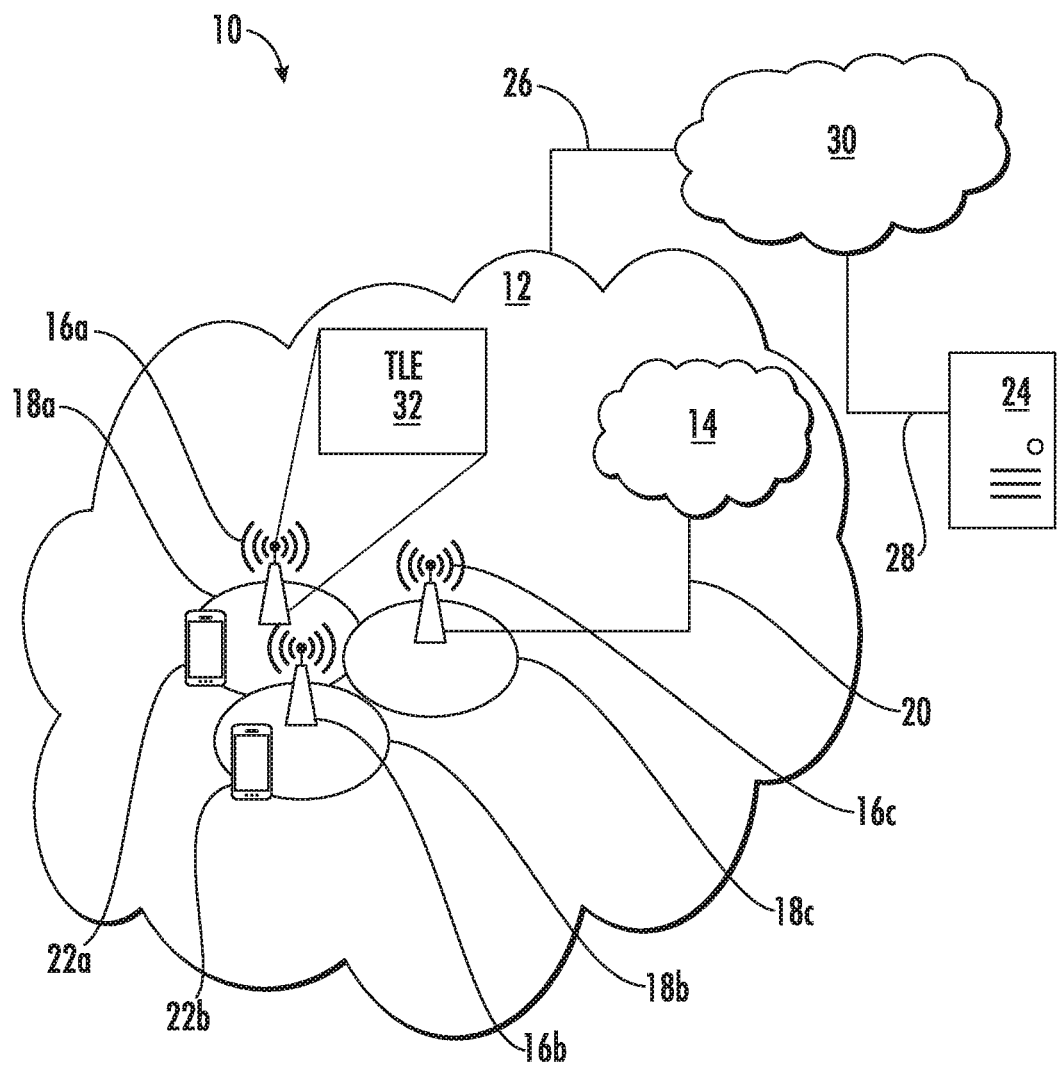
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to predicting and adapting to mobile radio link characteristics in a sector. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) or wireless device are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for predicting and adapting to mobile radio link characteristics in a sector. According to one aspect, radio link trajectories are predicted for a given WD with a high degree of certainty given as little measurement history as possible and without human intervention. This may be achieved in some embodiments by adaptation of a reinforcement learning system architecture.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14.

The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a trajectory learning entity (TLE) 32 which is configured to learn a set of at least one trajectory based at least in part on a first set of observations received from at least one WD, a trajectory including a subset of the first set of observations. The network node 16 is further configured to include a mapping unit 34 which is configured to assign a trajectory in the set of at least one trajectory to a first WD of the at least one WD based at least in part on a second set of observations received from the first WD subsequent to receipt of the first set of observations.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a trajectory learning entity (TLE) 32 which is configured to learn a set of at least one trajectory based at least in part on a first set of observations received from at least one WD, a trajectory including a subset of the first set of observations. The processing circuitry 68 may also include a mapping unit 34 which is configured to assign a trajectory in the set of at least one trajectory to a first WD of the at least one WD based at least in part on a second set of observations received from the first WD subsequent to receipt of the first set of observations.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
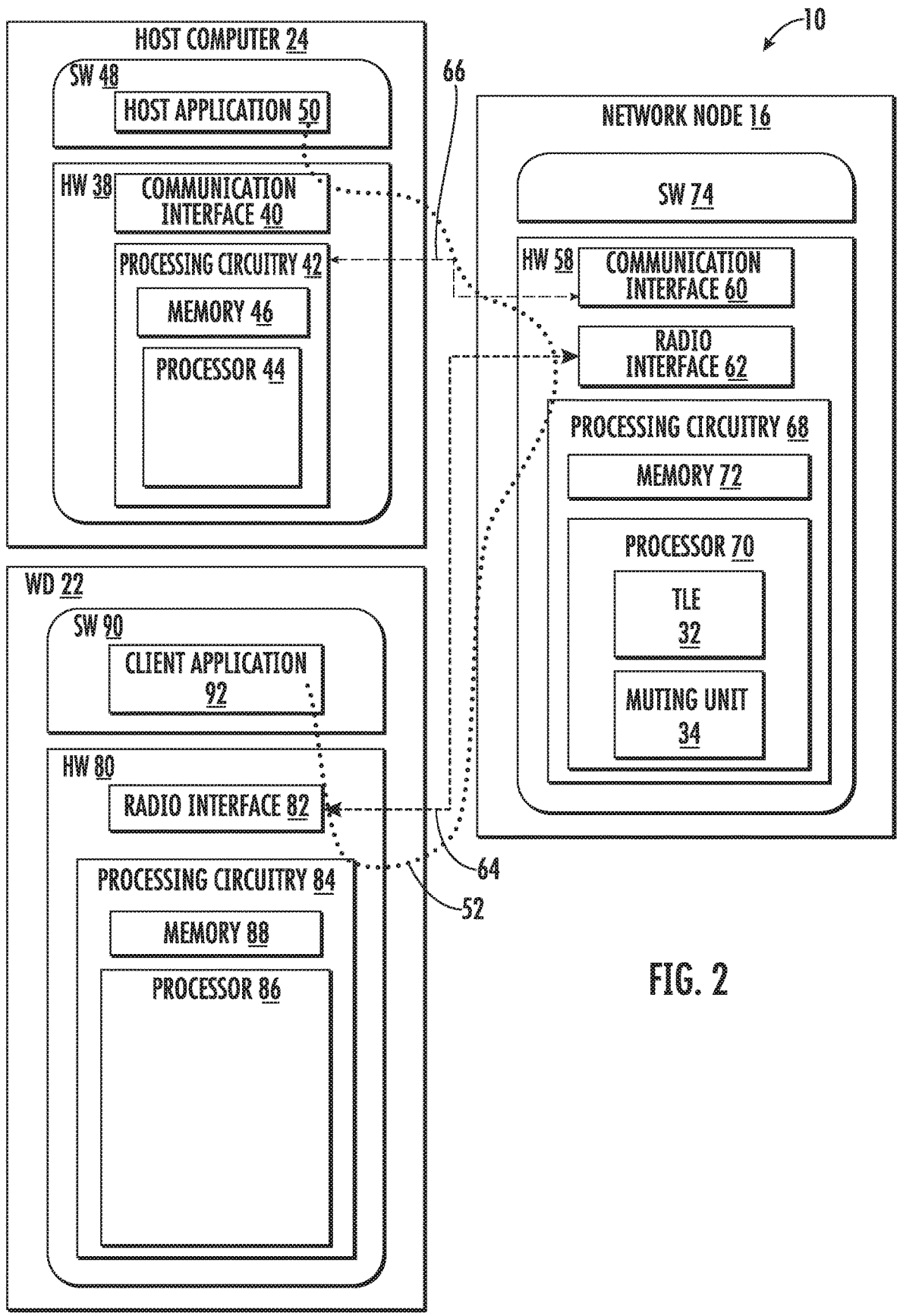
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both.

While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as TLE 32, and mapping unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

The system builds on the concept of trajectory. A trajectory defines a time-ordered list of CSI measurements experienced by a WD 22 in a sector. A particular sector can have infinitely many distinct trajectories. However, some embodiments rely on the premise that it is often feasible to identify a finite set of trajectories that can approximate most of the observable trajectories.

The system described herein performs a number of functions, including, in some embodiments:
1. Identify and refine the list of good trajectories; and
2. Map WDs 22 to one of these trajectories and if the mapping is successful, exploit that to perform link adaptation (LA) without having to probe for CSI measurements.

In order to achieve this, the system comprises the following entities:
1) Trajectory Learning Entity that "mines" for trajectories. Based on some "reward" signals in terms of how well the system is performing, it also refines these trajectories;
2) WD to Trajectory Mapping Entity that maps a WD 22 to one of the learned trajectories. A WD 22 with known trajectory can then be selected for trajectory-implied LA where the LA parameters are predicted without CSI polling; and
3) Trajectory Reward Entity that monitors the quality of WD 22 to trajectory mapping in terms of how well the mapping performs at LA and provides a reward to the Trajectory Learning Entity.

Figure 3:
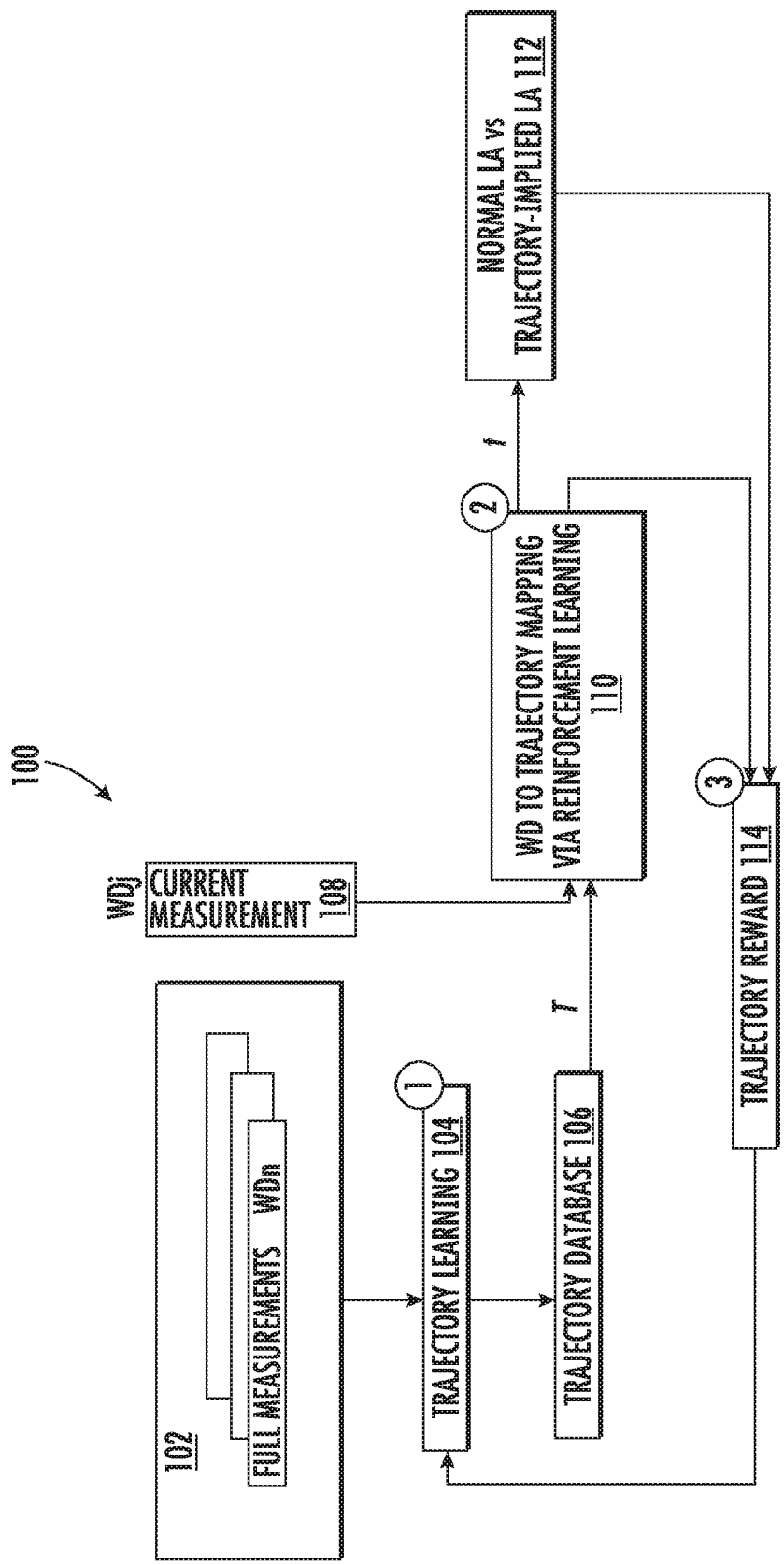
FIG. 3 is a block diagram of reinforced learning of trajectories according to principles disclosed herein.

These entities and the overall system 10 are depicted in the example block diagram of FIG. 3. A plurality of full channel measurements 102 are collected from N WDs 22. The trajectory learning entity 104 learns trajectories based on the full channel measurements. A full channel measurement is a channel measurement that normally occurs in the absence of trajectory mapping. The learned trajectories are stored in a trajectory database 106. Current measurements 108 of the channel between the network node 16 and a WD 22 are fed to a WD-to-trajectory mapping entity 110 that relies on reinforcement learning. The current measurements 108 are compared to the known trajectories from the trajectory data base 106, and the trajectory mapping entity 20 outputs a parameter t to a decision block 112 which decides whether normal link adaptation (LA) or trajectory-implied LA is to be used. The trajectory mapping entity 110 also outputs a parameter used by the trajectory reward entity 114 to determine feed back to the trajectory learning entity 104.

Figure 4:
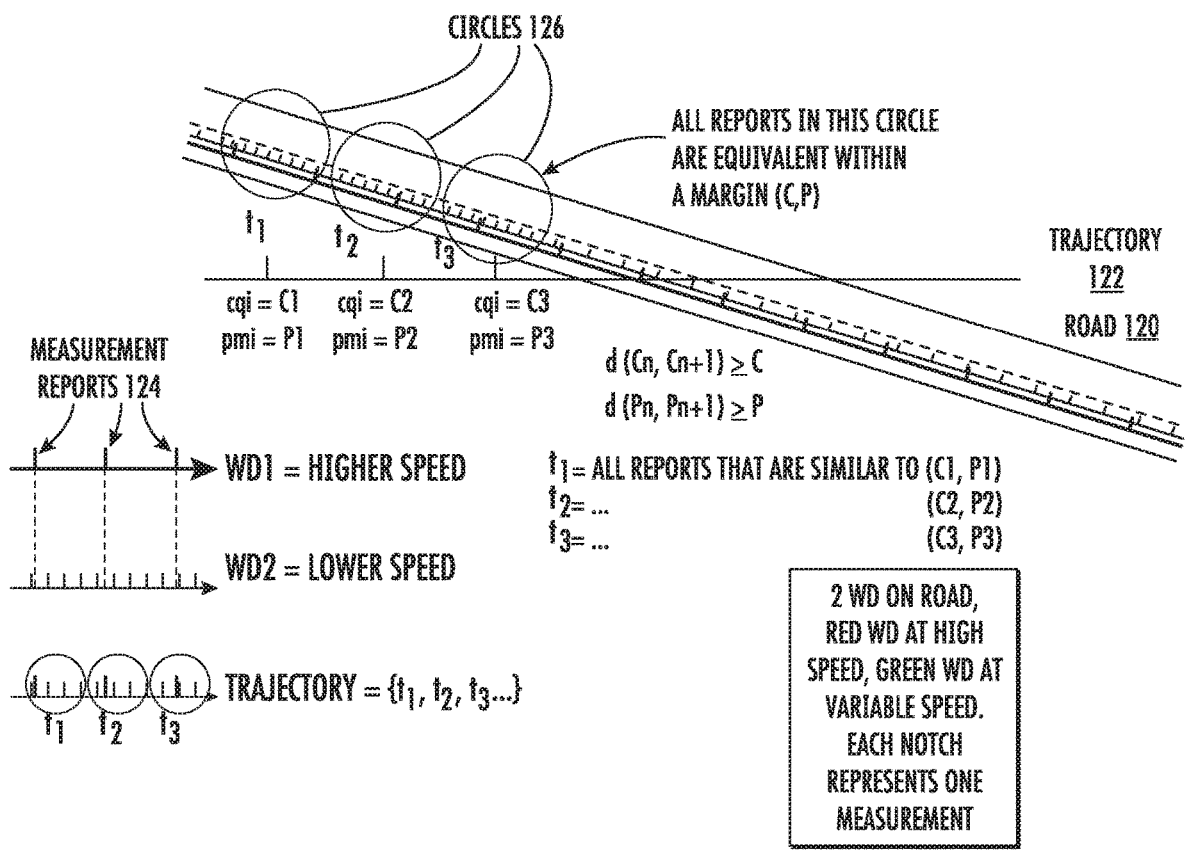
FIG. 4 is an illustration of channel measurements along a trajectory as one or more WDs move along a road, the circles showing a distance within which channel reports are within a margin (C, P)

Referring to FIG. 4, the trajectory learning entity 104 creates and refines a trajectory based on a sufficient number of learning episodes. Each known trajectory consists of a set of select measurement reports and associated actions that are distinct from each other by a margin (C, P), where C may be a bound on channel quality indicators and P may be bound on precoder matrix indicators. (Rank may also be added but for simplicity of explanation, rank is omitted for now). C and P may be chosen to be larger than the radio channel variation at a certain geographical location. Also, any measurement report within the C, P margin should result in the same LA action.

A WD 22 traveling on a road 120 may be characterized as being on an existing trajectory T 122 defined by a set of measurement reports 124 M={m1, m2 ... }. Each measurement report mi should be within a distance from a select measurement $d(mi, tj) \leq$ margin (C, P). The action associated with the select measurement report should be the same as the action the classical link adaptation algorithm would take for the measurement.

Some of the measurements in the set M={m1, m2 ... } could be similar (differ by less than the margin (C, P)), and therefore will correspond to the same select measurement tj. Since remembering the entire set M of measurement reports would consume extra memory, only a subset of measurements Mu representing only unique (non-similar) measurements are stored, in some embodiments. All other measurements in M that are equivalent to one select measurement tj are represented by that one unique select measurement and therefore may be discarded. Note that a WD 22 travelling at lower speeds will exhibit a subset Mu that is larger than a WD 22 traveling at higher speeds. In FIG. 4, the circles 126 represent a boundary wherein all measurement reports are within the margin (C, P).

"Learning" a trajectory means accumulating enough measurements from enough WDs 22 to create the set of select measurements {t1, t2, ... }, and tune the margins C and P for each select trajectory tj. A trajectory is declared "learned" when a sufficient number of WDs 22 exhibit measurement sets M that fall a large percentage, for example, 99.9%, within the trajectory T. An example approach is depicted in FIG. 5.

Figure 5:
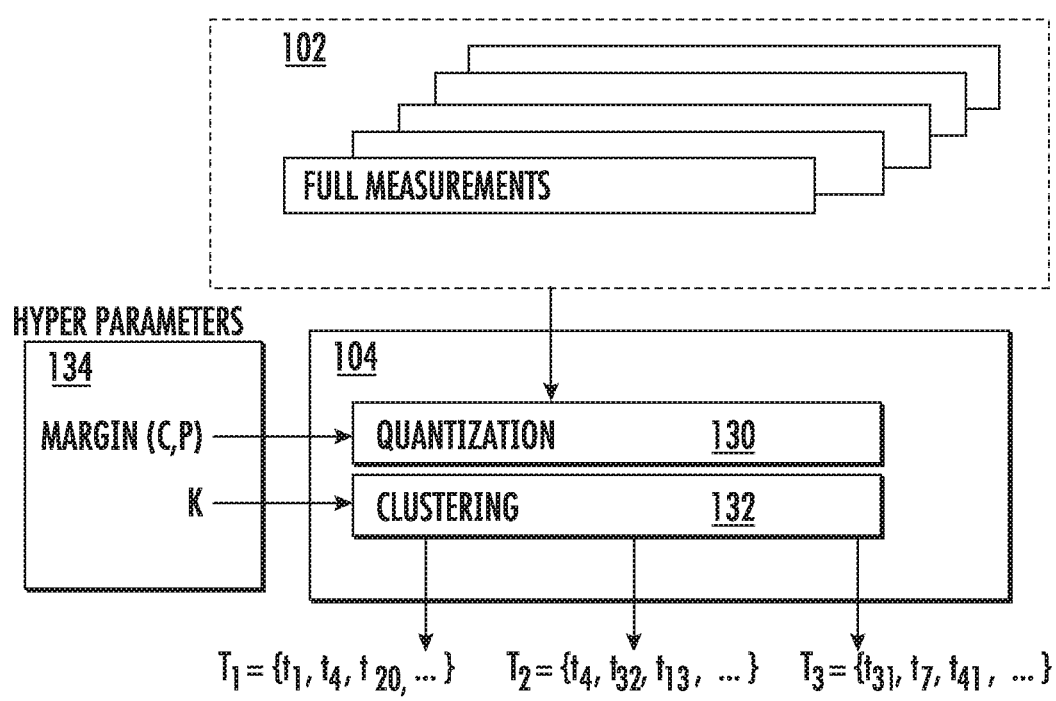
FIG. 5 is a block diagram of a trajectory learning entity according to principles disclosed herein.

FIG. 5 is a block diagram of a Trajectory Learning Model example that may be implemented by the trajectory learning entity 104. The learning algorithm involves quantization 130 and clustering 132 of a large ensemble of full channel measurements 102. The system can and should maintain these measurements in a database. The model will then give out a set of trajectories based on the learning algorithms influenced by the hyper parameters 134, which may include quantization Margin(C,P) and the clustering parameter K which influences the number of trajectories.

Once there are enough measurements for enough WDs 22, the trajectory learning entity 104 can determine a set of learned or "known" trajectories. However, this open-loop "clustering and quantization", though intuitive, cannot guarantee good system performance. Feedback from the trajectory reward entity 114 enables the trajectory learning entity to adapt the learned trajectories to a current state. For example, when the system detects that a large number of newly arriving WDs 22 are either not being mapped into any trajectory or the quality of mapping is poor, the trajectory learning entity may need to refine the trajectory.

Figure 6:
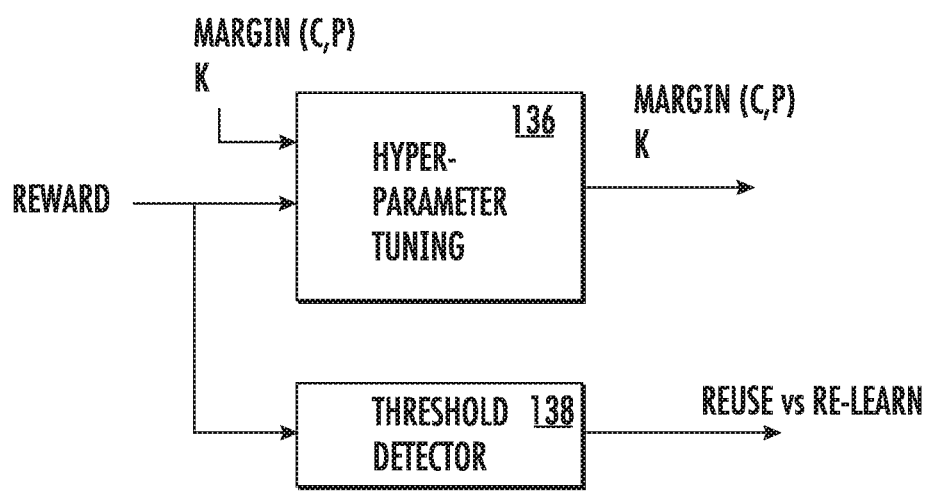
FIG. 6 illustrates hyper parameter tuning of the margin (C, P) and threshold detection for determining when to reuse or relearn a trajectory.

FIG. 6 is a block diagram that depicts an example of the closed loop feedback described above. A hyper parameter tuning block 136 receives the hyper parameters 134 and the reward feedback from the trajectory reward entity 114, and tunes the hyper parameters 134 based on the feedback. A threshold detector 138 compares the reward to a threshold to determine whether to reuse an existing trajectory or relearn a new trajectory.

The reward feedback can be used in at least two ways. Reward feedback can be compared to a threshold and the trajectory learning entity 104 can "re-learn" a new trajectory based on the most recent cache of channel measurements.

Reward feedback can also be used to perform hyper-parameter tuning where the margins (C, P) and the number of trajectories to be learned are input to the hyper parameter tuning block 136. Any time the hyper-parameters are updated, the trajectory learning entity 104 may run the learning algorithm of FIG. 5 again with the most up-to-date cached channel measurements.

Figure 7:
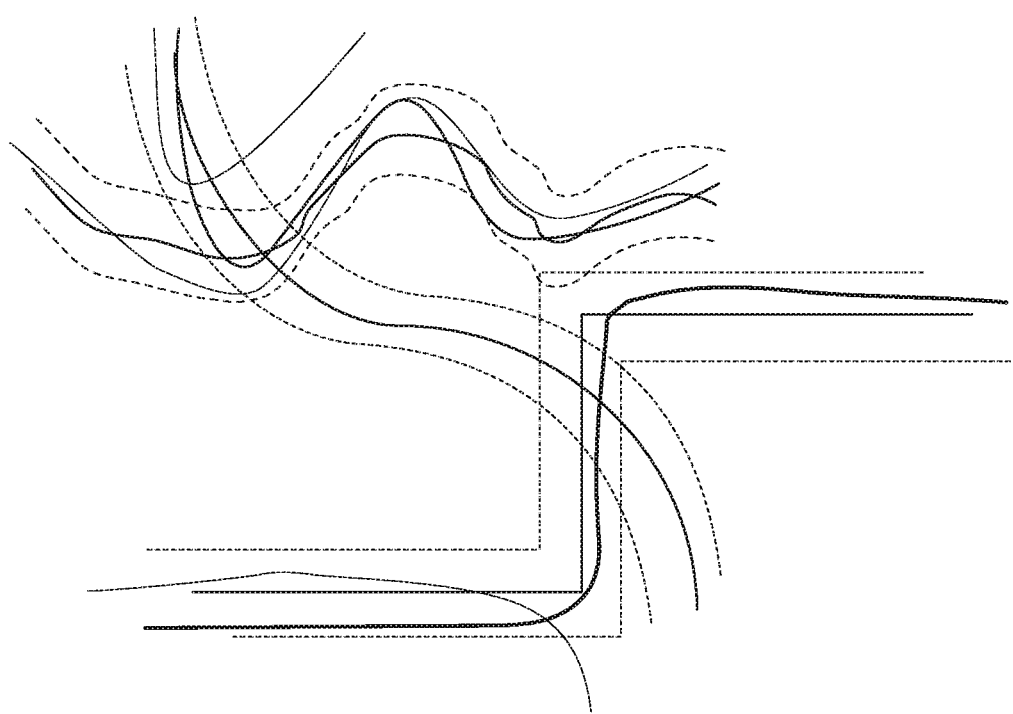
FIG. 7 shows WD mobility across some distinct physical trajectories.

The learned trajectories determined by the trajectory learning entity 104 are used by the WD 22 to trajectory mapping entity 110 to learn a dynamic mapping from observations for a given WD 22 to one of the learned trajectories with the objective of successfully tracking the WD 22 as it travels along a path that is at the union of a set of known trajectories. This is illustrated in the following FIG. 7, which shows WD 22 mobility across some distinct physical trajectories. A good dynamic WD-to-trajectory mapping scheme would be able to map the WD 22 to the right trajectory at any point in time and do so for the longest possible span.

For each WD 22 in the sector, the system 100 attempts to perform a mapping from the input-observations (recent history of the channel measurements) $\vec{S}_n \in S$ to one of the known trajectories $t \in T$. Such a learning can happen at run-time based on the experience obtained by past attempts at such mappings and the consequences of such mappings. An objective of the system 100 may be to maximize the accumulated reward over a period of time, referred to as an Episode. An episode E may start at the moment the system 100 maps the WD 22 to one of the know trajectories until the moment when the trajectory classification fails. More formally, the following reward-system may be implemented:

The network node 16 may estimate the spectral efficiency (SPE) loss for each trajectory-mapping decision made by the system 100. This may be done by comparing the SPE obtained using the parameters from the selected trajectory $\hat{t}_n$ against SPE obtained by classical link-adaption with frequent channel probing;

Reward $r_n=1$ is fed to the learning agent if the SPE loss is within an upper-bound $c_{th}$, 0 otherwise:

$$r_n = 1, \text{ if } \left|1 - \frac{spe(\hat{t}_n)}{spe(\vec{S}_n)}\right| < c_{th}$$
$$= 0, \text{ Otherwise}$$

Note that, the environment feeding the reward to the trajectory learning entity 104 is essentially an estimator in the network node 16 which:

"simulates" the reward when the network node 16 does not actually use the mapped trajectory to perform the DL transmissions; and derives the reward through observations on the actual state of transmission quality based on, for example, feedback on the transmissions made using the LA parameters of the selected trajectory (block error rate (BLER) etc.)

A sample episode E starts at the time the system 100 assigns a previously unassigned WD 22 to a known trajectory. The episode terminates when reported reward $r_n$ for this WD 22 is 0.

The (discounted) return at time n is given as follows (where $\gamma \in (0,1]$ is the discount factor on future rewards):

$$R_n = \sum_{k=n}^{T} \gamma^{k-n} \times r_k$$

It is expected that only a fraction of the wireless devices in the sector will follow predictable trajectories, so the performance of the learning system should not be judged only by how many wireless devices are assigned to a known trajectory, but also by how long can the network "track" this WD 22 once the WD 22 is assigned to a known trajectory, along a set of known trajectories before it detects that the WD 22 cannot be associated with any of the known trajectories. This objective is captured in the return function above.

This is consistent with the goal that once a new device is assigned to a known trajectory, the difference between the output of classical Link Adaptation algorithm and the output of the selected known trajectory remains below a threshold for the rest of the trajectory. Further, the network can track the WD 22 if it transitions to another trajectory during its time in the sector.

It is possible that the system 100 decides to not associate a WD 22 with any trajectory, in which case, the WD 22 is seen to be mapped to a special trajectory, say, the NULL trajectory. In another alternative, a temporary trajectory may be assigned with some expectation that in the future, other WDs 22 can follow the temporary trajectory. If no more WDs follow a give trajectory within a certain time period, the temporary trajectory and the resources associated with it may be released and/or deleted. Note that some trajectories could be reinforced at certain times of day or even during weekends only (e.g., shopping malls, people going to ski on Friday night etc.).

Learning Algorithm

Figure 8:
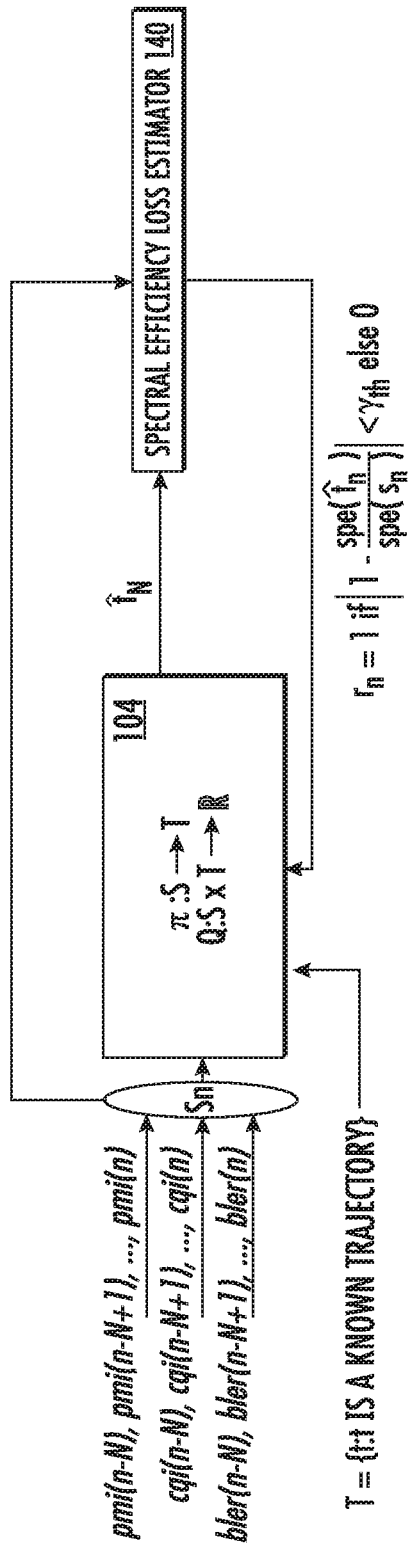
FIG. 8 illustrates operation of a trajectory learning entity which receives feedback from a spectral efficiency (SPE) loss estimator.

Referring to FIG. 8, the trajectory learning entity 104 implements a learning algorithm that attempts to determine a policy π that helps it pick a trajectory (potentially stochastic) from recent observations by exploiting the multitude of episodes that it experiences. The trajectory learning entity 104 may start with a potentially random policy, which is improved as the trajectory learning entity 104 observes more of its environment. Once the trajectory learning entity 104 experiences enough samples, it moves to a "learned"-phase where the trajectory mapping entity 110 can reliably map a WD 22 to one of the known trajectories. Note that the spectral efficiency loss estimator 140 may estimate the spectral efficiency for each trajectory.

An optimal "action-value" function $Q^*(\vec{S}_n, t)$ represents the maximum return expected from selecting an arbitrary trajectory t, at time n (with observation $\vec{S}_n$). More formally, if $R_n$ is a measure of "return" at time n, $Q^*(\vec{s}, t)$ is defined as $$= \max_{\pi} \mathbb{E}\left[R_n | \vec{s}_n = s, \hat{t}_n = t\right]$$

Note, that the maximum may be taken over all possible policies.

Assuming that the system 100 approximates the action-value function $Q^*(.,.)$, the system 100 performs trajectory selection at time n as follows:

$$\hat{t}_n = \max_{t \in T}\{Q(\vec{s}_n, t)\},$$

with probability 1−ϵ,
where the maximum is taken over all possible policies.

$$\hat{t}_n = \max_{t \in T}\{Q(\vec{s}_n, t)\},$$

with probability 1−ϵ.
t*(s)=random trajectory t∈T
Here, ϵ represents exploration-exploitation trade-off.

Figure 9:
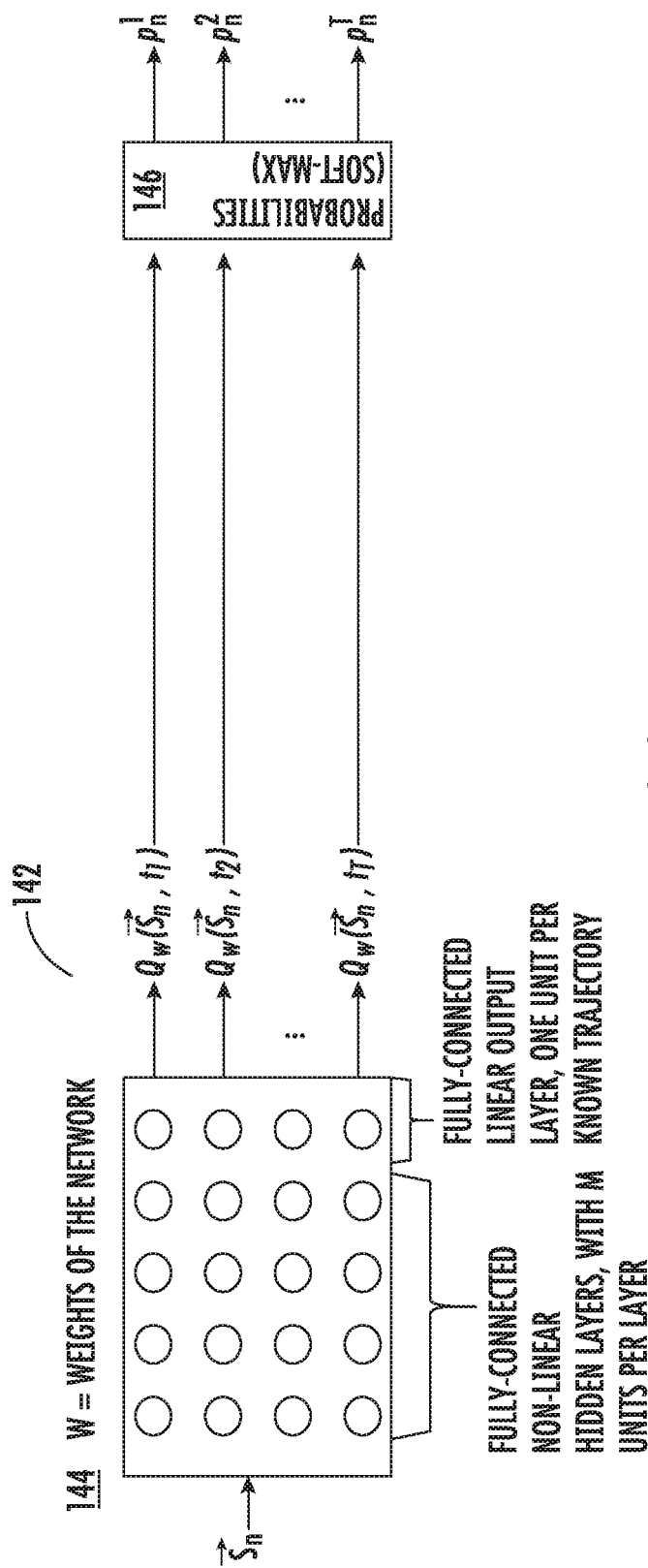
FIG. 9 illustrates a neural network used to learn trajectories.

A neural-network based non-linear function-approximator is employed to iteratively learn a good estimate of the above mapping Q*. Such a neural network is diagrammed in FIG. 9. The neural network 142 has a number of fully-connected hidden layers, each with rectifier units, and a linear output layer with as many units as the number of known trajectories. The neural network is parameterized with weights w, 144 that are initialized randomly. Optionally, the output is also passed through a soft-max layer to convert these action-values into probabilities 146.

The learning progresses by iterative updates of w 144 by minimizing a loss function $L_i(w)$ at iteration i, i=1, 2, . . . , which is calculated as the squared error between the observed discounted return and the return predicted by the system model, for some recent state-transition $\{\vec{S}_m, \hat{t}_m, r_m, \vec{S}_{m+1}\}$, m∈{n−N, n}, such that:

$$L_i(w) = \left\|\left(r_m + \gamma \max_{r \in T} Q_w(\vec{S}_{m+1}, r)\right) - Q_w(\vec{S}_m, \hat{t}_m)\right\|^2$$

This iteration involves one update of w based on the gradient of this loss-function, as shown below.

$$w_{i+1} = w_i - \alpha * \nabla L_i(w = w_i)$$

where $\nabla L_i(w)$ is gradient of the loss function, and α is the learning rate.

As described above, the trajectory learning entity 104 learns a set of trajectories based on the cache of channel measurements and using learning parameters that dictate the number of trajectories and the set of so-called select measurements. In order to make the system "self-correcting", there may be feedback applied which can then be used to decide if the trajectories have to be refined or not. The reward structure can be defined in multiple ways, and as long as the reward signal monotonically increases with system performance, the reward signal can be used by the system 100. As examples, the following metric of system performance can be used to infer such reward: rate of failure of recent WD-to-trajectory decisions, i.e., rate at which WDs 22 are mapped to the NULL trajectory. This metric may be used when the current set of trajectories are good quantizations of the current system. The trajectories can go stale if the spatial and radio aspects of the network and WD mobilities change over time.

The time-average spectral efficiency loss across WDs 22 may be employed in the WD-to-trajectory-mapping scheme. As discussed above, the spectral efficiency loss metric determined by SPE loss estimator 140 to generate re-enforcements for the trajectory learning entity 104 to come up with a good WD 22 to trajectory mapping strategy. Good may be defined, for examples, as the mapping providing the highest spectral efficiency. The spectral efficiency can also be used to derive the reward for the trajectory learning entity. The reward can be a function of the average spectral efficiency loss in a recent round of measurements.

A simple example of the reward system is outlined below.
Trajectory reward entity 114 monitors the number of "mis-classifications" in the WD 22 to trajectory mapping decisions;
If n is the number of times a WD 22 was mapped to a NULL trajectory in the last N mapping decisions, reward may be calculated as follows $$reward = \frac{(N-n)}{N}.$$

N can be some reasonably large number.

The reward value is constantly signaled to trajectory learning entity 104 in some embodiments. Note that this is only an example and rewards can be defined by combining multiple metrics of system performance, for example.

Figure 10:
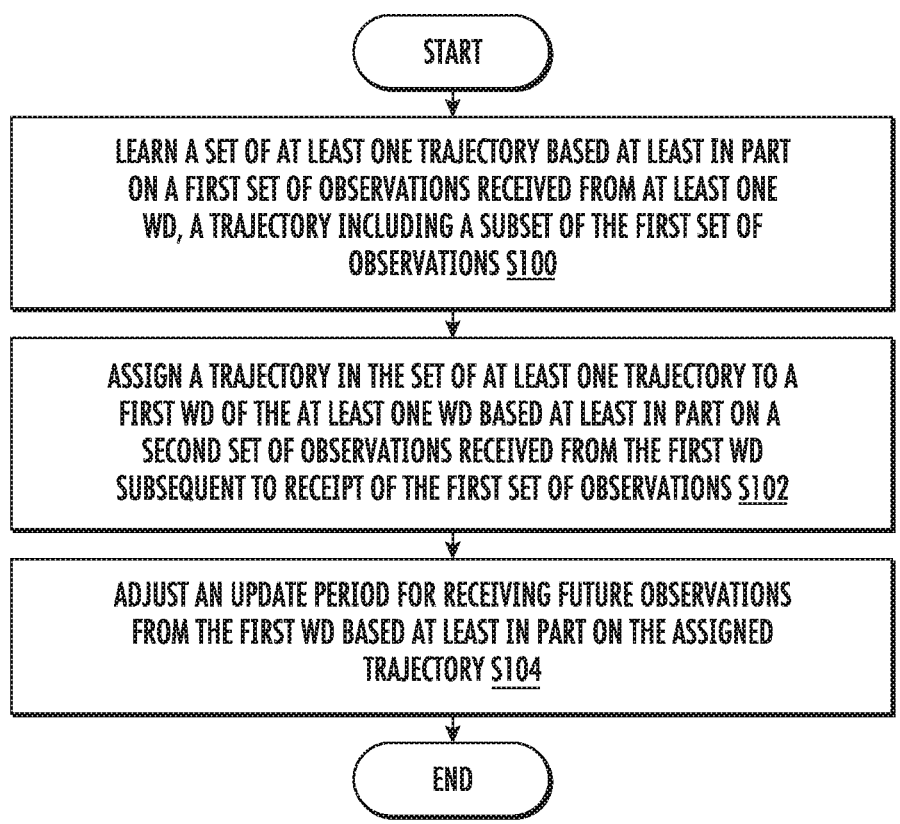
FIG. 10 is a flowchart of an example process in a network node for trajectory learning, assignment and adjustment according to principles disclosed herein.

FIG. 10 is a flowchart of an example process that may be performed by the processing circuitry 68, including memory 72, processor 70 (including TLE 32 and mapping unit 34) and radio interface 82. The process includes learning a set of at least one trajectory based at least in part on a first set of observations received from at least one WD 22, a trajectory including a subset of the first set of observations (Block S100). The process also includes assigning a trajectory in the set of at least one trajectory to a first WD 22 of the at least one WD 22 based at least in part on a second set of observations received from the first WD 22 subsequent to receipt of the first set of observations (Block S102). The process further includes adjusting an update period for receiving future observations from the first WD 22 based at least in part on the assigned trajectory (Block S104).

Thus, according to one aspect, a method in a network node 16 configured to communicate with a wireless device (WD) is provided. The method includes learning, via the TLE 32, a set of at least one trajectory based at least in part on a first set of observations received from at least one WD 22, a trajectory including a subset of the first set of observations. The method also includes assigning, via the mapping unit 34, a trajectory in the set of at least one trajectory to a first WD 22 of the at least one WD 22 based at least in part on a second set of observations received from the first WD 22 subsequent to receipt of the first set of observations. The method further includes adjusting, via the processing circuitry 68, an update period for receiving future observations from the first WD 22 based at least in part on the assigned trajectory.

According to this aspect, in some embodiments, the method further includes periodically updating, via the processing circuitry 68, at least one trajectory of the set of at least one trajectory based on observations received from the at least one WD 22 subsequent to receipt of the second set of observations. In some embodiments, assigning the trajectory to the first WD 22 includes maximizing an accumulated reward over a period of time. In some embodiments, a reward to be accumulated in the accumulated reward is reinforcing if a spectral efficiency achieved by the update period deviates from a spectral efficiency achieved by a baseline update period by less than a threshold amount. In some embodiments, the accumulated reward is based at least in part on how long the first WD 22 is considered to belong to an assigned trajectory. In some embodiments, learning the set of at least one trajectory includes updating a policy by which to pick a trajectory to assign to the first WD 22, the updating being based at least in part on observations of the first set of observations. In some embodiments, the updating begins with a random policy. In some embodiments, the method further includes selecting, via the processing circuitry 68, a policy by which to pick the trajectory to assign to the first WD 22, the selected policy having a highest expected return of a set of policies. In some embodiments, a policy having a highest expected return of a set of policies is determined based on a neural network applied to a set of observations of the second set of observations. In some embodiments, an observation of one of the first and second set of observations includes at least one of a channel quality indicator, a precoder matrix indicator and statistics on block errors.

According to another aspect, a network node 16 is configured to communicate with a wireless device (WD) 22. The network node 16 includes processing circuitry 68 configured to: learn a set of at least one trajectory based at least in part on a first set of observations received from at least one WD 22, a trajectory including a subset of the first set of observations; assign a trajectory in the set of at least one trajectory to a first WD 22 of the at least one WD 22 based at least in part on a second set of observations received from the first WD 22 subsequent to receipt of the first set of observations; and adjust an update period for receiving future observations from the first WD 22 based at least in part on the assigned trajectory. In some embodiments, the processing circuitry 68 is further configured to periodically update at least one trajectory of the set of at least one trajectory based on observations received from the at least one WD 22 subsequent to receipt of the second set of observations. In some embodiments, assigning the trajectory to the first WD 22 includes maximizing an accumulated reward over a period of time. In some embodiments, a reward to be accumulated in the accumulated reward is reinforcing if a spectral efficiency achieved by the update period deviates from a spectral efficiency achieved by a baseline update period by less than a threshold amount. In some embodiments, the accumulated reward is based at least in part on how long the first WD 22 is considered to belong to an assigned trajectory. In some embodiments, learning the set of at least one trajectory includes updating a policy by which to pick a trajectory to assign to the first WD 22, the updating being based at least in part on observations of the first set of observations. In some embodiments, the updating begins with a random policy. In some embodiments, the processing circuitry is further configured to select a policy by which to pick the trajectory to assign to the first WD 22, the selected policy having a highest expected return of a set of policies. In some embodiments, a policy having a highest expected return of a set of policies is determined based on a neural network applied to a set of observations of the second set of observations. In some embodiments, an observation of one of the first and second set of observations includes at least one of a channel quality indicator, a precoder matrix indicator and statistics on block errors.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node configured to communicate with a wireless device (WD), the method comprising:
   learning a set of at least one trajectory based at least in part on a first set of observations received from at least one WD, a trajectory including a subset of the first set of observations; and
   assigning a trajectory in the set of at least one trajectory to a first WD of the at least one WD based at least in part on a second set of observations received from the first WD subsequent to receipt of the first set of observations, assigning the trajectory including maximizing an accumulated reward over a period of time, the accumulated reward being based at least in part on how long the first WD is considered to belong to an assigned trajectory; and
   adjusting an update period for receiving future observations from the first WD based at least in part on the assigned trajectory.

2. The method of claim 1, further comprising periodically updating at least one trajectory of the set of at least one trajectory based on observations received from the at least one WD subsequent to receipt of the second set of observations.

3. The method of claim 1, wherein a reward to be accumulated in the accumulated reward is reinforcing if a spectral efficiency achieved by the update period deviates from a spectral efficiency achieved by a baseline update period by less than a threshold amount.

4. The method of claim 1, wherein learning the set of at least one trajectory includes updating a policy by which to pick a trajectory to assign to the first WD, the updating being based at least in part on observations of the first set of observations.

5. The method of claim 4, wherein the updating begins with a random policy.

6. The method of claim 4, further comprising selecting a policy by which to pick the trajectory to assign to the first WD, the selected policy having a highest expected return of a set of policies.

7. The method of claim 6, wherein a policy having a highest expected return of a set of policies is determined based on a neural network applied to a set of observations of the second set of observations.

8. The method of claim 1, wherein an observation of one of the first and second set of observations includes at least one of a channel quality indicator, a precoder matrix indicator and statistics on block errors.

9. A network node configured to communicate with a wireless device (WD), the network node comprising processing circuitry configured to:

learn a set of at least one trajectory based at least in part on a first set of observations received from at least one WD, a trajectory including a subset of the first set of observations;

assign a trajectory in the set of at least one trajectory to a first WD of the at least one WD based at least in part on a second set of observations received from the first WD subsequent to receipt of the first set of observations, assigning the trajectory including maximizing an accumulated reward over a period of time, the accumulated reward being based at least in part on how long the first WD is considered to belong to an assigned trajectory; and adjust an update period for receiving future observations from the first WD based at least in part on the assigned trajectory.

10. The network node of claim 9, wherein the processing circuitry is further configured to periodically update at least one trajectory of the set of at least one trajectory based on observations received from the at least one WD subsequent to receipt of the second set of observations.

11. The network node of claim 9, wherein a reward to be accumulated in the accumulated reward is reinforcing if a spectral efficiency achieved by the update period deviates from a spectral efficiency achieved by a baseline update period by less than a threshold amount.

12. The network node of claim 9, wherein learning the set of at least one trajectory includes updating a policy by which to pick a trajectory to assign to the first WD, the updating being based at least in part on observations of the first set of observations.

13. The network node of claim 12, wherein the updating begins with a random policy.

14. The network node of claim 12, wherein the processing circuitry is further configured to select a policy by which to pick the trajectory to assign to the first WD, the selected policy having a highest expected return of a set of policies.

15. The network node of claim 14, wherein a policy having a highest expected return of a set of policies is determined based on a neural network applied to a set of observations of the second set of observations.

16. The network node of claim 9, wherein an observation of one of the first and second set of observations includes at least one of a channel quality indicator, a precoder matrix indicator and statistics on block errors.

* * * * *